(12) United States Patent
Jiang et al.

(10) Patent No.: US 12,450,510 B2
(45) Date of Patent: Oct. 21, 2025

(54) INCREASING REPRESENTATION ACCURACY OF QUANTUM SIMULATIONS WITHOUT ADDITIONAL QUANTUM RESOURCES

(71) Applicant: Google LLC, Mountain View, CA (US)

(72) Inventors: Zhang Jiang, San Francisco, CA (US); Ryan Babbush, Venice, CA (US); Jarrod Ryan McClean, Marina Del Rey, CA (US); Nicholas Charles Rubin, San Francisco, CA (US)

(73) Assignee: Google LLC, Mountain View, CA (US)

( * ) Notice: Subject to any disclaimer, the term of this patent is extended or adjusted under 35 U.S.C. 154(b) by 1106 days.

(21) Appl. No.: 17/428,189

(22) PCT Filed: Feb. 14, 2020

(86) PCT No.: PCT/US2020/018387
§ 371 (c)(1),
(2) Date: Aug. 3, 2021

(87) PCT Pub. No.: WO2020/168257
PCT Pub. Date: Aug. 20, 2020

(65) Prior Publication Data
US 2022/0019931 A1 Jan. 20, 2022

Related U.S. Application Data

(60) Provisional application No. 62/804,498, filed on Feb. 15, 2019.

(51) Int. Cl.
*G06N 10/00* (2022.01)
*G06F 9/455* (2018.01)
*G06F 17/16* (2006.01)

(52) U.S. Cl.
CPC ............ *G06N 10/00* (2019.01); *G06F 9/455* (2013.01); *G06F 17/16* (2013.01)

(58) Field of Classification Search
CPC .......... G06N 10/00; G06F 9/455; G06F 17/16
See application file for complete search history.

(56) References Cited

U.S. PATENT DOCUMENTS

2016/0191060 A1* 6/2016 McDermott, III ..... B82Y 10/00
326/3

FOREIGN PATENT DOCUMENTS

CN        108369668        8/2018

OTHER PUBLICATIONS

Mcclean, J. R., Romero, J., Babbush, R., & Aspuru-Guzik, A. (2016). The theory of variational hybrid quantum-classical algorithms. New Journal of Physics, 18(2), 023023. (Year: 2016).*

(Continued)

*Primary Examiner* — Kamran Afshar
*Assistant Examiner* — Lokesha Patel
(74) *Attorney, Agent, or Firm* — Fish & Richardson P.C.

(57) ABSTRACT

Methods, systems and apparatus for simulating physical systems. In one aspect, a method includes the actions of selecting a first set of basis functions for the simulation, wherein the first set of basis functions comprises an active and a virtual set of orbitals; defining a set of expansion operators for the simulation, wherein expansion operators in the set of expansion operators approximate fermionic excitations in an active space spanned by the active set of orbitals and a virtual space spanned by the virtual set of orbitals; performing multiple quantum computations to determine a matrix representation of a Hamiltonian characterizing the system in a second set of basis functions, computing, using the determined matrix representation of the Hamiltonian, eigenvalues and eigenvectors of the Ham- (Continued)

iltonian; and determining properties of the physical system using the computed eigenvalues and eigenvectors.

20 Claims, 4 Drawing Sheets

(56) References Cited

OTHER PUBLICATIONS

Keller, S., Dolfi, M., Troyer, M., & Reiher, M. (2015). An efficient matrix product operator representation of the quantum chemical Hamiltonian. The Journal of chemical physics, 143(24). (Year: 2015).*
Whitfield, J. D., Love, P. J., & Aspuru-Guzik, A. (2013). Computational complexity in electronic structure. Physical Chemistry Chemical Physics, 15(2), 397-411. (Year: 2013).*
Takeshita et al., "Increasing the representation accuracy of quantum simulations of chemistry without extra quantum resources." Physical Review X 10.1, Jan. 2020, 9 pages.
Office Action in Australian Appln. No. 2023203460, mailed on Jun. 3, 2024, 3 pages.
Office Action in Chinese Appln. No. 202080014744.2, mailed on Apr. 9, 2024, 18 pages (with English translation).
Notice of Allowance in Australian Appln. No. 2023203460, mailed on Sep. 20, 2024, 3 pages.
Cao et al, "Quantum chemistry in the age of quantum computing" arXiv, 2020, 97 pages.
Colless et al, "Computation of molecular spectra on a quantum processor with an error-resilient algorithm" Physical Review, 2018, 7 pages.
McClean et al, "Hybrid quantum-classical hierarchy for mitigation of decoherence and determination of excited states" Physical Review, 2017, 10 pages.
PCT International Preliminary Report in International Application No. PCT/US2020/018387, dated Aug. 26, 2021, 11 pages.
PCT International Search Report and Written Opinion in International Application No. PCT/US2020/018387, dated Jun. 18, 2021, 17 pages.
Reiher et al, "Elucidating reaction mechanisms on quantum computers" Proceedings of the national academy of science, 2017, 17 pages.
Rubin, "A hybrid classical/quantum approach for large-scale studies of quantum systems with density matrix embedding theory" arXiv, 2020, 10 pages.
Office Action in Australian Appln. No. 2020223177, dated Jun. 21, 2022, 3 pages.
Notice of Acceptance in Australian Appln. No. 2020223177, dated Feb. 21, 2023, 3 pages.
CA Office Action in Canadian Appln. No. 3,130,397, dated Nov. 23, 2022, 5 pages.
Office Action in Chinese Appln. No. 202080014744.2, mailed on Aug. 17, 2024, 13 pages (with English translation).

* cited by examiner

INCREASING REPRESENTATION ACCURACY OF QUANTUM SIMULATIONS WITHOUT ADDITIONAL QUANTUM RESOURCES

CROSS-REFERENCE TO RELATED APPLICATION

This application is a National Stage Application under 35 U.S.C. § 371 and claims the benefit of International Application No. PCT/US2020/018387, filed Feb. 14, 2020, which claims priority to U.S. Application No. 62/806,498, filed Feb. 15, 2019, the disclosure of which is incorporated herein by reference.

BACKGROUND

This specification relates to quantum computing.

Applications of quantum computing include quantum simulation. The simulation of quantum systems has applications in a variety of different areas ranging from pharmaceutical synthesis to the design of novel catalysts and materials. However, simulating complex quantum systems using classical techniques is untenable due to the exponential scaling of required resources as a function of system size N. Quantum computers and quantum simulation techniques offer potential solutions to this task.

SUMMARY

This specification describes methods and systems for increasing the representation accuracy of quantum simulations of quantum systems without requiring additional quantum computing resources, e.g., additional qubits, increased gate complexity or increased circuit depth.

In general, one innovative aspect of the subject matter described in this specification can be implemented in a method for method for simulating a physical system characterized by an electronic structure Hamiltonian, comprising: selecting a first set of basis functions for the simulation, wherein the first set of basis functions comprises an active set of orbitals, and a virtual set of orbitals; defining a set of expansion operators for the simulation, wherein expansion operators in the set of expansion operators approximate fermionic excitations in an active space spanned by the active set of orbitals and a virtual space spanned by the virtual set of orbitals; performing multiple quantum computations to determine: a matrix representation of the electronic structure Hamiltonian in a second set of basis functions, wherein each basis function in the second set of basis functions comprises a respective expansion operator applied to a wavefunction prepared in the active space, and an overlap matrix in the second set of basis functions, wherein each element of the overlap matrix represents a respective overlap of two basis functions in the second set of basis functions; wherein determining the matrix representation of the electronic structure Hamiltonian or the overlap matrix comprises, for each matrix element: determining whether the matrix element comprises operators that act on the virtual space or operators that act on the active space only; in response to determining that the matrix element comprises operators that act on the virtual space, performing a classical computation to contract the matrix element to a matrix element comprising operators that act on the active space only; measuring the operators that act on the active space only to determine a value for the matrix element; computing, using the determined matrix representation of the electronic structure Hamiltonian in the second set of basis functions and the determined overlap matrix, eigenvalues and eigenvectors of the electronic structure Hamiltonian; and determining properties of the physical system using the computed eigenvalues and eigenvectors.

Other implementations of these aspects includes corresponding computer systems, apparatus, and computer programs recorded on one or more computer storage devices, each configured to perform the actions of the methods. A system of one or more classical and/or quantum computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations measuring operators that act on the active space only to determine a value for the matrix element comprises: preparing the wavefunction in the active space; and measuring a Pauli operator corresponding to a qubit transformation of the matrix element.

In some implementations the method further comprises, before computing eigenvalues and eigenvectors of the electronic structure Hamiltonian: computing eigenvalues and eigenvectors of the determined overlap matrix; removing eigenvalues of the determined overlap matrix that are equal to zero or smaller than a predetermined threshold to define an updated overlap matrix; and using the updated overlap matrix to compute the eigenvalues and eigenvectors of the electronic structure Hamiltonian.

In some implementations the first set of basis functions further comprises a core set of orbitals.

In some implementations defining a set of expansion operators for the simulation further comprises selecting a maximum excitation level for the set of expansion operators.

In some implementations the active space comprises a subspace of total active space that is excited into the virtual space.

In some implementations measuring the operators that act on the active space only to determine a value for the matrix element comprises: approximating the operators that act on the active space only using cumulant approximations or ensemble variational methods; and measuring the approximated operators that act on the active space only.

In some implementations the electronic structure Hamiltonian characterizes the electronic structure of a semiconductor, and wherein simulating the physical system comprises simulating properties of the semiconductor. Properties of the semiconductor may comprise conductivity or resistance.

In general, another innovative aspect of the subject matter described in this specification can be implemented in a method for simulating a quantum system characterized by a respective Hamiltonian, the method comprising: obtaining a simulation output from a quantum simulation of the quantum system, wherein the quantum simulation comprises quantum simulation in active space; and adjusting, by classical computation, the simulation output using multiple single particle rotations in full space to obtain an estimated energy of the quantum system characterized by the respective Hamiltonian, comprising solving a nonlinear optimization problem, wherein the nonlinear optimization problem comprises: an objective function comprising an expected value of the energy of the quantum system for a measured 2-RDM, and a one or more constraints that specify unitary rotations of Hamiltonian orbitals.

Other implementations of these aspects includes corresponding computer systems, apparatus, and computer programs recorded on one or more computer storage devices, each configured to perform the actions of the methods. A system of one or more classical and/or quantum computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations the simulation output comprises an estimated energy of the quantum system.

In some implementations the Hamiltonian characterizing the quantum system is an electronic structure Hamiltonian, and wherein the simulation output comprises a 2-RDM for the ground state of the quantum system.

In some implementations solving the nonlinear optimization problem further comprises parameterizing a unitary operator representing the multiple single particle rotations as an exponentiated anti-Hermitian matrix.

In some implementations solving the nonlinear optimization problem comprises parameterizing a unitary operator representing the multiple single particle rotations as a product of Givens rotations.

In some implementations solving the nonlinear optimization problem comprises implementing a multi-configurational self-consistent-field method.

In some implementations the one or more constraints produce normalized and physical wavefunctions.

In some implementations the method further comprises iteratively, until a change in energy between iterations is lower than a predetermined threshold: providing the adjusted simulation output as an input for a subsequent quantum simulation in active space of the quantum system; and obtaining a subsequent simulation output from the subsequent quantum simulation of the quantum system.

The subject matter described in this specification can be implemented in particular ways so as to realize one or more of the following advantages.

Applications of quantum computing for quantum chemistry typically focus on the solutions of hard problems within a reduced space, called the active space. Restricting to the active space enables the number of qubits required to solve parts (e.g., essential parts) of hard chemistry problems to be reduced. However, this reduction is not exact. While the essential physics of the problem may be captured, important effects such as electronic cusps that make quantitative accuracy difficult to achieve are neglected. Computation and/or simulation results can therefore be inaccurate.

To capture these additional important effects additional basis functions—which can translate to additional qubits and increased quantum gate complexity during the physical implementation of the quantum simulations—are required. In most applications, the number of additional basis functions/qubits can be very large. Therefore, determining accurate solutions to such problems can be extremely difficult and costly—particularly when using near- or intermediate-term quantum computers, e.g., noisy intermediate-scale quantum (NISQ) devices with numbers of qubits ranging from tens to hundreds.

The present specification introduces quantum simulation techniques that extend beyond the active space without requiring additional qubits or quantum gate complexity. Accordingly, quantum simulations performed using the presently described techniques reintroduce important physical effects and can achieve improved simulation accuracy. The methods achieve an exponential advantage over their classical counterparts in the treatment of the active space and active-space reference. In addition, optional approximations that can be implemented to increase the efficiency of the quantum simulation scheme are introduced. These optional approximations can reduce the number of measurement operations required by the quantum simulation scheme, thus decreasing the amount of quantum computational resources used in the quantum simulation.

The presently described techniques are particularly suitable for performing quantitatively accurate calculations for chemical systems on near-term or intermediate-term quantum computers. In the long term, the techniques may also be used for the competitiveness of fault-tolerant approaches to simulating quantum systems, e.g., chemical systems. By determining matrix elements and overlap matrices in the active space using the quantum computing device, and using a classical computing device to perform pre-computation and/or post processing to determine physical properties of the system from the matrix elements and overlap matrices, the method is effectively optimized to run on a hybrid quantum-classical computing device.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

This specification describes techniques for simulating quantum systems, e.g., systems characterized by the electronic structure Hamiltonian. When simulating a quantum system, a discretization of space (or basis set) can be selected to represent the quantum system. The blocks used to divide space are called basis functions, and a number of canonical choices of bases are known, e.g., linear combinations of atomic orbitals and plane waves. Once the basis is selected, the Hamiltonian that characterizes the quantum system can be expressed using the selected basis. For example, the electronic structure Hamiltonian can be written in its canonical form as $$H = \sum_{ij} h_{ij} a_i^\dagger a_j + \frac{1}{2} \sum_{i,j,k,l} h_{ijkl} a_i^\dagger a_j^\dagger a_k a_l \qquad (1)$$

where each index i, j, k, l corresponds to one basis function in the chosen basis, $h_{ij}$ and $k_{ijkl}$ represent standard integrals over the involved basis functions, and the ladder operators $a^\dagger$, a satisfy the canonical fermionic anti-commutation relations $\{a_i^\dagger, a_j\} = \delta_{ij}$, $\{a_i, a_j\} = \{a_i^\dagger, a_j^\dagger\} = 0$.

The accuracy that can be achieved for a simulation of a quantum system is dependent on the number of basis functions in the selected basis. That is, generally, increasing the number of basis functions increases the accuracy of the simulation. However, using too many basis functions can make the simulation task impractical or can be wasteful of resources when more insightful treatments may instead be used.

One method that was first used in traditional quantum chemistry and has been adopted by the quantum computing community is the active space approximation. The physical intuition behind the active space approximation is that the discretized space may be divided into a portion which exhibits strong correlations or entanglement—the active space—and a portion that while important, exhibits only low rank contributions that can be well treated perturbatively—the virtual space. However, the size of the essential quantum component or active space remains limited on a classical computer, and to date the contributions of virtuals have remained absent on a quantum computer.

This specification describes quantum simulation techniques and systems that extend beyond the active space approximation without requiring additional qubits or gate complexity. One example technique includes leveraging quantum subspace expansion to reintroduce contributions from the virtual space in a systematic manner to improve simulation accuracy. Another example technique uses orbital relaxations to remove the active-space approximation and reduce circuit depth.

Example Hardware

Figure 1:
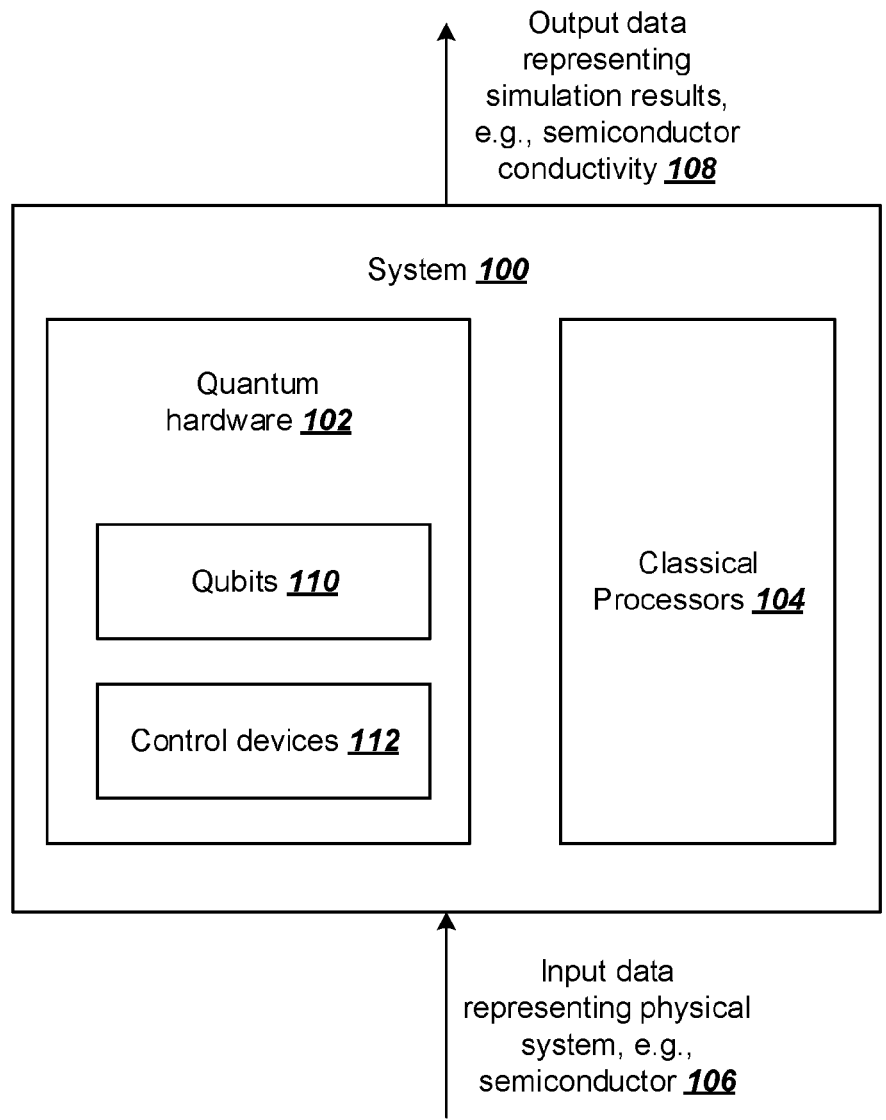
FIG. 1 depicts an example system for simulating a physical system.

FIG. 1 depicts an example system 100 for simulating a quantum system. The example system 100 is an example of a system implemented as classical and quantum computer programs on one or more classical computers and quantum computing devices in one or more locations, in which the systems, components, and techniques described in this specification can be implemented.

The system 100 may receive as input data specifying a physical system that is to be modeled or simulated, e.g., input data 106. For example, the received data may represent a material, e.g., a metal or polymer, a single molecule or a chemical. The input data may include data representing a Hamiltonian characterizing the physical system that is to be modeled or simulated, e.g., an electronic structure Hamiltonian.

The system 100 may generate as output data representing results of a simulation of the physical system of interest, e.g., output data 108. The generated output data may be provided for further processing or analyzing. For example, in cases where the physical system is a material, e.g., a metal or polymer, the generated output data may include data representing a simulated ground state of the physical system that may be used to determine properties of the material, e.g., its resistance or conductivity. As another example, in cases where the physical system is a chemical, the generated output data may be used to determine properties of the chemical, e.g., a rate of a chemical reaction.

The system 100 includes quantum hardware 102 in data communication with a classical processor 104. For convenience, the classical processor 104 and quantum computing hardware 102 are illustrated as separate entities, however in some implementations the classical processor 104 can be included in quantum computing hardware 102, e.g., the quantum computing hardware 102 can include one or more components for performing classical computing operations.

The quantum hardware 102 includes components for performing quantum computation, e.g., the quantum simulation procedures described in this specification. For example, the quantum hardware 102 includes multiple qubits 110 and control devices 112 for controlling the qubits 110 and causing algorithmic operations or quantum computations to be performed.

The multiple qubits 110 are physical qubits used to perform algorithmic operations or quantum computations. The specific physical realization of the qubits 110 included in the quantum computing hardware 102 and how they interact with one another is dependent on a variety of factors including the type of quantum computations that the quantum computing hardware 102 is performing (which in turn can depend on the physical system being simulated). For example, in some implementations the qubits may include qubits that are physically realized via atomic, molecular or solid-state quantum systems. In other implementations the qubits may include superconducting qubits, e.g., Gmon qubits, or semi-conducting qubits. In other implementations ion traps, photonic devices or superconducting cavities (with which states may be prepared without requiring qubits) may be used. Further examples of physical realizations of qubits include fluxmon qubits, silicon quantum dots or phosphorus impurity qubits.

The type of control devices 112 included in the quantum hardware 102 depends on the type of qubits 110 included in the quantum hardware 102. For example, in some cases the qubits 110 can be frequency tunable. In these cases, each qubit may have associated operating frequencies that can be adjusted using one or more control devices 112, e.g., an excitation pulse generator and control lines that couple the qubits to the excitation pulse generator. Example operating frequencies include qubit idling frequencies, qubit interaction frequencies, and qubit readout frequencies. Different frequencies correspond to different operations that the qubit can perform. For example, setting the operating frequency to a corresponding idling frequency may put the qubit into a state where it does not strongly interact with other qubits, and where it may be used to perform single-qubit gates. As another example, in cases where qubits interact via couplers with fixed coupling, qubits can be configured to interact with one another by setting their respective operating frequencies at some gate-dependent frequency detuning from their common interaction frequency. In other cases, e.g., when the qubits interact via tunable couplers, qubits can be configured to interact with one another by setting the parameters of their respective couplers to enable interactions between the qubits and then by setting the qubit's respective operating frequencies at some gate-dependent frequency detuning from their common interaction frequency. Such interactions may be performed in order to perform multi-qubit gates.

The control devices 112 may further include devices, e.g., readout resonators, that are configured to perform measurements on the qubits 110 and provide measurement results to the classical processors 104 for processing and analyzing.

The classical processor 204 includes components for performing classical computation, e.g., the classical post-processing procedures described in this specification.

Figure 2:
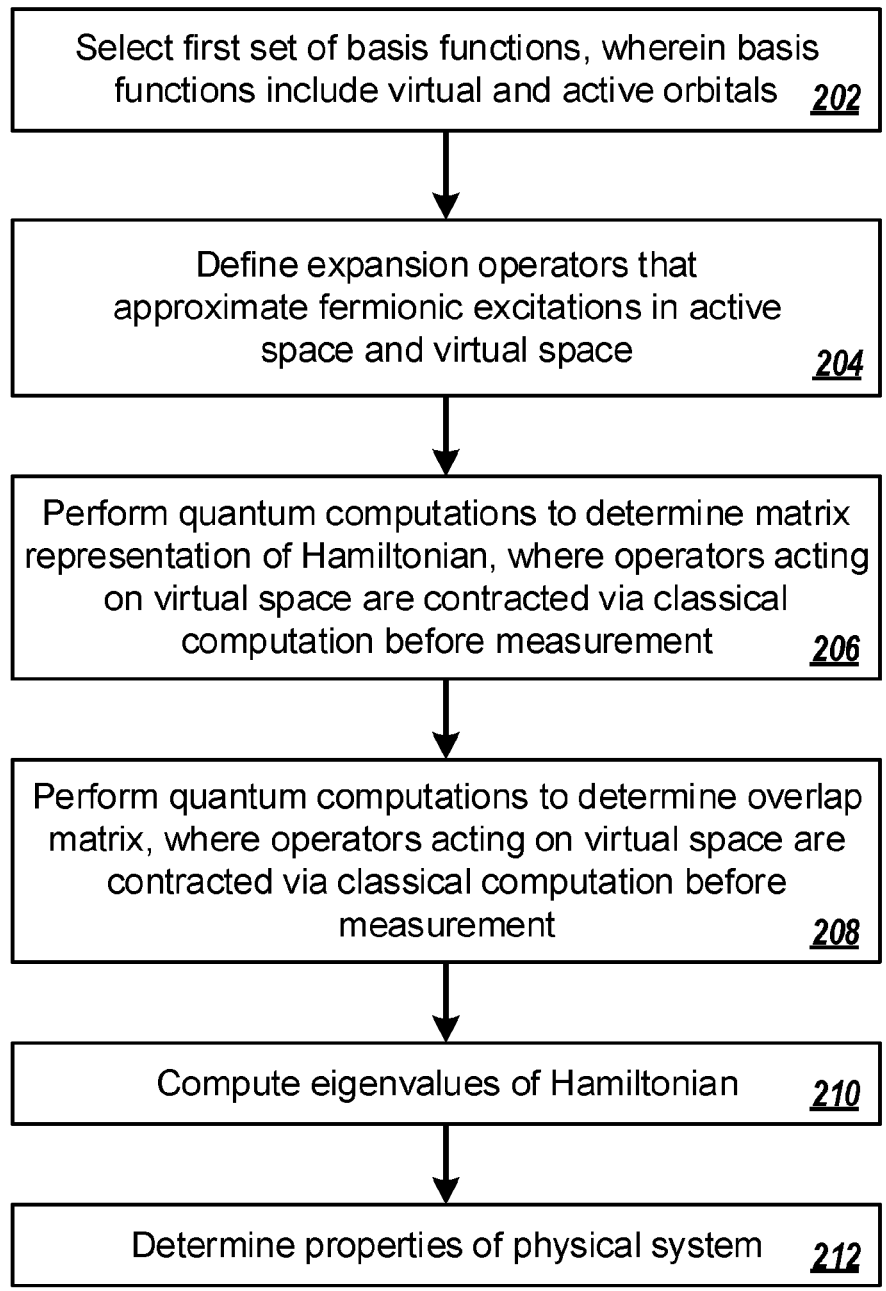
FIG. 2 is a flow diagram of an example process for simulating a physical system using quantum subspace expansion.

Programming the Hardware: An Example Process for Simulating a Quantum System Using Quantum Subspace Expansion FIG. 2 is a flow diagram of an example process 200 for simulating a quantum system characterized by a respective Hamiltonian using quantum subspace expansion. For convenience, the process 200 will be described as being performed by a system of one or more classical and quantum computing devices located in one or more locations. For example, a quantum computation system, e.g., the system 100 of FIG. 1, appropriately programmed in accordance with this specification, can perform the process 200.

The system selects a first set of basis functions for the simulation (step 202). The system may then define the Hamiltonian using the selected first set of basis functions. For example, as described above, in some cases the Hamiltonian may be an electronic structure Hamiltonian. In these cases the electronic structure Hamiltonian can be written in the canonical form given by Equation (1) above where each index value for i, j, k, l in Equation (1) corresponds to a respective basis function.

The first set of basis functions includes a set of core orbitals $\mathcal{C}$, active orbitals $\mathcal{A}$ and virtual orbitals $\mathcal{V}$. In typical quantum chemistry calculations on quantum computers (i.e., calculations different to those described in this specification), the core orbitals are assumed to be doubly occupied and their contributions are integrated out to an effective field felt by the active space and virtual space. In these typical quantum chemistry calculations, virtual orbitals are ignored, and the problem is solved exactly within the active space, $\mathcal{A}$.

The system can determine which elements of the first set of basis functions belong in each subset $\mathcal{C}$, $\mathcal{A}$ or $\mathcal{V}$ by performing a classical pre-computation. For example, the system can perform a mean-field calculation such as Hartree-Fock on the quantum system of interest. Performing such a calculation produces a set of new orbitals built from the original that is well-ordered in terms of energy. The lowest orbitals in energy are unlikely to participate in bonding and are labeled or designated as the core orbitals. The orbitals closest in energy to the highest occupied orbital can then be labelled or designated as the active orbitals in the active space. The remaining orbitals are labelled or designated as virtual orbitals. In some cases this classical pre-computation can be enhanced by going beyond the mean-field level, and instead ordering by occupation in natural orbitals. In addition, the classical pre-computation can be further refined by considering orbital entanglement approximately in a method such as the density matrix renormalization group.

The system defines a set of expansion operators $O_i$ (step 204). The expansion operators include operators that approximate fermionic excitations on the active space $\mathcal{A}$ (the space spanned by the set of active orbitals) and virtual space $\mathcal{V}$ (the space spanned by the set of virtual orbitals). For example, the set of expansion operators can be given by Equation (2) below.

$$O_i \in \{a_i^\dagger a_p, a_\mu^\dagger a_q a_v^\dagger a_r | i \in \mathcal{A} \cup \mathcal{V} \ ; p,q,r \in \mathcal{A} \ ; \mu,\nu \in \mathcal{V}\} \qquad (2)$$

In Equation (2), $a^\dagger$, a represent fermionic annihilation and creation operators. The number of expansion operators in the defined set is determined by the number of original basis functions, in combinations with which have been labeled as core, active, or virtual by the classical pre-step described above. If the indices in Equation (2) are counted for the size of $\mathcal{A} \cup \mathcal{V}$, $\mathcal{A}$, and $\mathcal{V}$ the number of expansion operators in the defined set can be determined exactly from these set sizes and the fact that terms with 2 indices and 4 indices are drawn from the sets selectively.

The system performs multiple quantum computations to determine a matrix representation of a target operator (corresponding to a target observable for the simulation) in a second set of basis functions (step 206). For convenience, the below description continues using the example of the electronic structure Hamiltonian as the target operator (where energy is the target observable), however other target operators and observables may be used (depending on the simulation being performed). The calculation of such matrix elements by a classical computational device is typically highly computationally costly, especially for states that exhibit strong correlations and/or entanglement. By contrast, the use of quantum computation to determine the matrix elements inherently takes the strong correlations and/or entanglement into account.

Each basis function in the second set of basis functions is defined via application of a respective expansion operator $O_i$ to a reference wavefunction $|\Psi_{ref}\rangle$ which can be (efficiently) prepared within the active space $\mathcal{A}$. That is, the second set of basis functions may be given by $\{O_i|\Psi_{ref}\rangle\}$. The matrix representation of the electronic structure Hamiltonian H is determined through measurement operations and have matrix elements given by Equation (3) below.

$$H_{ij} = \langle \Psi_{ref} | O_i^\dagger H O_j | \Psi_{ref} \rangle \qquad (3)$$

To determine each matrix element $H_{ij}$, the system can repeatedly prepare the wavefunction $|\Psi_{ref}\rangle$ (by preparing qubits in the quantum computing device in a corresponding quantum state) and measure a Pauli operator corresponding to the transformation of the matrix element by a Jordan-Wigner or equivalent transformation. In some implementations more general measurement techniques can be used, e.g., phase estimation or ancilla assisted estimation.

In some implementations the second set of basis functions $\{O_i|\Psi_{ref}\rangle\}$ may be non-orthogonal. In these implementations the system can further determine an overlap (or metric) matrix S in the second set of basis functions (to ensure that the problem is well defined) (step 208). Each element of the overlap matrix S represents a respective overlap of two basis functions in the set of basis functions. Each element may be formed through measurement operations and may be given by Equation (4) below.

$$S_{ij} = \langle \Psi_{ref} | O_i^\dagger O_j | \Psi_{ref} \rangle \qquad (4)$$

Again, to determine each matrix element $S_{ij}$, the system can repeatedly prepare the wavefunction $|\Psi_{ref}\rangle$ (by preparing qubits in the quantum computing device in a corresponding quantum state) and measure a Pauli operator corresponding to the transformation of the matrix element by a Jordan-Wigner or equivalent transformation.

The expansion operators defined in step 204 and Equation (2) above include expansion operators that act, in principle, on qubits that define the active space $\mathcal{A}$ and the virtual space $\mathcal{V}$. However, by definition the wavefunction $|\Psi_{ref}\rangle$ has no components that act on the virtual space $\mathcal{V}$. Therefore, expansion operators that act on the virtual space can be contracted using a classical pre-computation, e.g., application of Wick's theorem or equivalent, on the Hamiltonian such that the quantum computation of each matrix element $H_{ij}$ and $S_{ij}$ can be performed in the active space only.

For example, in some implementations step 206 may include determining, through measurement, a matrix element given by Equation (5) below.

$$M = \langle \Psi_{ref} | a_\xi a_s^\dagger a_\eta a_r^\dagger a_i^\dagger a_j^\dagger a_k a_l a_\mu^\dagger a_p a_\nu^\dagger a_q | \Psi_{ref} \rangle \quad (5)$$

In Equation (5), Greek letters represent virtual orbitals. Performing a classical pre-computation in this case may include contracting the operators on the virtual space in Equation (5) using Wick's theorem to obtain an alternative representation as given below in Equation (6).

$$M = \Delta_{\xi\eta,\mu\nu} \langle a_s^\dagger a_r^\dagger a_i^\dagger a_j^\dagger a_k a_l a_p a_q \rangle + \quad (6)$$

$$\sum_{x=i,j} \sum_{y=l,k} (-1)^{\delta_{xj} + \delta_{yk}} (\delta_{\xi x} \Delta_{y\eta,\mu\nu} - \delta_{\eta x} \Delta_{y\xi,\mu\nu}) \langle a_s^\dagger a_r^\dagger a_{\bar{x}}^\dagger a_y a_p a_q \rangle +$$

$$\Delta_{\xi\eta,ij} \Delta_{kl,\mu\nu} \langle a_s^\dagger a_r^\dagger a_p a_q \rangle$$

In Equation (6), $\Delta_{\xi\eta,\mu\nu} = \delta_{\xi\nu} \delta_{\eta\mu} - \delta_{\xi\mu} \delta_{\eta\nu}$, $\bar{x}(\bar{y})$ represents x(y) changing to another value in the summation (e.g., $\bar{i} = j$ for x) and ⟨ ... ⟩ represents expectation values with respect to the wavefunction $|\Psi_{ref}\rangle$ in the active space. The term $\langle a_s^\dagger a_r^\dagger a_i^\dagger a_j^\dagger a_k a_l a_p a_q \rangle$ represents a 4 electron reduced density matrix (4-RDM), $\langle a_s^\dagger a_r^\dagger a_{\bar{x}}^\dagger a_{\bar{y}} a_p a_q \rangle$ represents a 3 electron density matrix (3-RDM), and $\langle a_s^\dagger a_r^\dagger a_p a_q \rangle$ represents a 2 electron density matrix (2-RDM).

The expansion operators defined in Equation (2) include single and double excitations with respect to the reference wavefunction $|\Psi_{ref}\rangle$ both within and outside the active space, as shown in Equation (2). However, in some implementations the excitation number may be varied to arbitrary levels either within or outside the active space, or subdivisions of it. That is, the system may select a maximum excitation level k for the set of expansion operators for arbitrary k. For k levels of excitation, the expected number of measurements included in process 200 will grow as $N_A^{(4+2k)}$. As this number is increased, the expected accuracy of both the ground state and approximations to excited states will increase, however the cost of measurement will as well.

The system uses the determined matrix representation of the electronic structure Hamiltonian H and the determined overlap matrix S to compute eigenvalues and eigenvectors of the electronic structure Hamiltonian (step 210). That is, the system may perform classical computations to solve the generalized eigenvalue problem given by Equation (7) below.

$$HC = SCE \quad (7)$$

In Equation (7), C represents a matrix of eigenvectors in the basis $\{O_i|\Psi_{ref}\rangle\}$ and E represents a diagonal matrix of eigenvalues. In some implementations a preprocessing step such as canonical diagonalization can be performed to remove zero or near-zero eigenvalues of the matrix S and generate an updated overlap matrix S' before the generalized eigenvalue problem in the well-conditioned subspace is solved.

The system determines properties of the quantum system using the computed eigenvalues and eigenvectors (step 212). For example, in some cases the electronic structure Hamiltonian may characterize the electronic structure of a semiconductor. In these cases simulating the physical system may include simulating properties of the semiconductor, e.g., simulating the conductivity or resistance of the semiconductor. Such simulation results may be used to fabricate semiconductor devices, e.g., integrated circuits. As another example, in some cases the electronic structure Hamiltonian may characterize a catalyst. In these cases simulating the physical system may include simulating properties of the catalyst, e.g., simulating catalytic activity. Such simulation results may be used to fabricate catalysts, e.g., electrocatalysts or biocatalysts.

Figure 3:
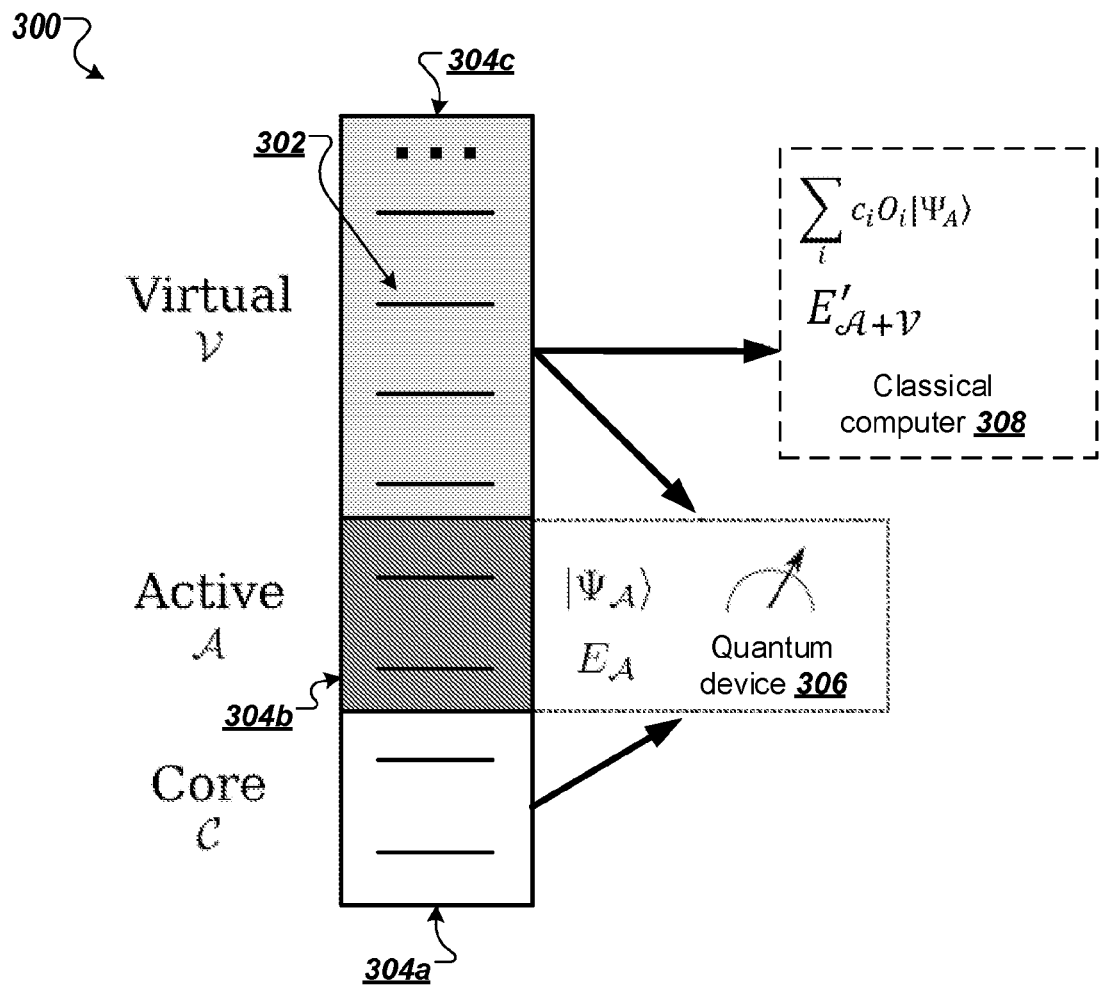
FIG. 3 is a schematic diagram of quantum subspace expansion for quantum simulation of a quantum system.

FIG. 3 is a schematic diagram 300 of the presently described virtual quantum subspace expansion techniques for quantum simulation of a quantum system, e.g., steps 202-210 of example process 200 described above.

As described above with reference to step 202 of example process, the techniques separate the orbitals (e.g., including orbital 102) of the quantum system into their core components 104a, active components 104b, and virtual components 104c.

As described above with reference to steps 204-208 of example process 200, a quantum computing device 106 simulates the quantum system (i.e., the state of the quantum system represented by a wavefunction) within the active space. Additional measurements are taken within this space. A classical computer 108 combines these additional measurements with classical post-processing from data on the virtual space 104c to improve the simulation using no additional qubits or circuit depth.

As described above with reference to steps 210-212 of example process 200, a resulting improved simulated wavefunction(s) can be stored in a mixed quantum-classical representation that may be used to derive target properties of the wavefunction(s).

Programming the Hardware: Cumulant and Restricted Active Space Approximations

In some implementations one or more approximations can be introduced into the example process 200 described above to improve tractability.

One example approximation includes the division of the active space $\mathcal{A}$ into a first part $\mathcal{A}_v$ which is excited into the virtual space $\mathcal{V}$, and a second part $\mathcal{A}_c$ of the active space which can be treated as correlated core orbitals. That is, in some implementations the system can perform example process 200 of FIG. 2 with $\mathcal{A} = \mathcal{A}_v$. Dividing the active space in this manner reduces the scaling in the number of measurements required to determine the matrices H and S to the original cost of computing the eigenvalues plus the size of the first part $\mathcal{A}_v$, $N_{\mathcal{A}_v}^8$, which for small sizes of $\mathcal{A}_v$ can reduce the cost significantly.

Another approximation includes estimating matrix elements of reduced density matrices (RDMs) via cumulant approximations or ensemble variational methods. For example, a series of approximations to a 4-RDM, e.g., as the 4-RDM defined in Equation (6), can be formed using products of lower RDMs and perturbative corrections. Such truncations can reduce the required number of terms to measure back to the number of active space orbitals $N_A^4$, but introduces some approximation to the target observable (e.g., energetic) values. An alternative is to stochastically sample the elements of the approximation to the 4-RDM to measure with increasing degrees of accuracy as time proceeds within a calculation.

Figure 4:
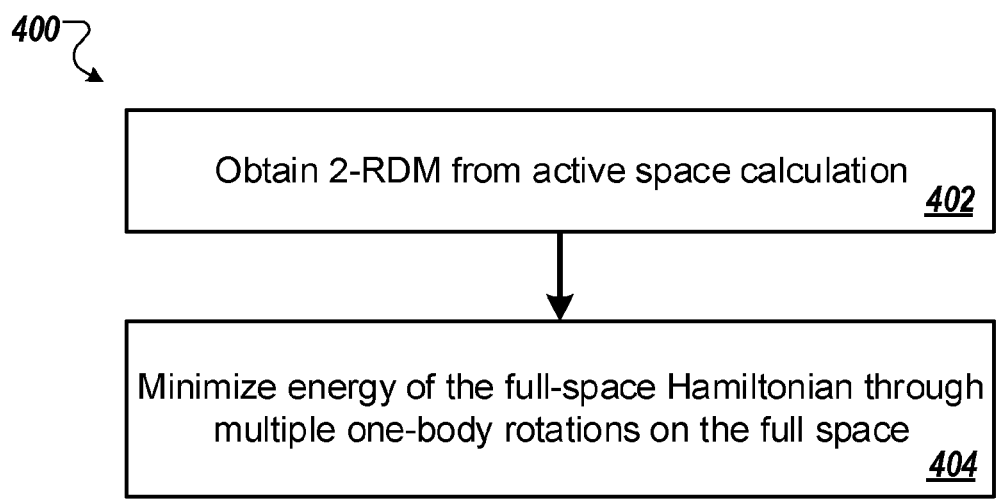
FIG. 4 is a flow diagram of an example process for simulating a physical system using full space orbital relaxation.

Programming the Hardware: An Example Process for Simulating a Quantum System Using Full Space Orbital Relaxation FIG. 4 is a flow diagram of an example process 400 for simulating a quantum system characterized a respective Hamiltonian using full space orbital relaxation. For convenience, the process 400 will be described as being performed by a system of one or more classical and quantum computing devices located in one or more locations. For example, a quantum computation system, e.g., the system 100 of FIG. 1, appropriately programmed in accordance with this specification, can perform the process 400.

The system obtains a simulation output from a quantum simulation of the quantum system (step 402). The quantum simulation can be a quantum simulation in active space, e.g., a quantum simulation performed using the active space approximation. The simulation output can be an estimated energy of the quantum system, e.g., an estimated energy associated with the Hamiltonian in active space. For example, in some implementations the Hamiltonian characterizing the quantum system can be an electronic structure Hamiltonian, as given by Equation (1) above. In these implementations the simulation output may include a 2-RDM from the ground state of a corresponding active-space Hamiltonian (the Hamiltonian that results from integrating out the virtual and core degrees of freedom). The system can obtain the simulation output from an active space method such as complete active space configuration interaction (CAS-CI), multi-configuration self-consistent field methods (MCSCF), density matrix renormalization group (DMRG), quantum Monte Carlo (QMC), or more generally from any method that outputs a 2-RDM (or N-representable 2-RDM).

The system performs a classical computation to adjust the simulation output using multiple single-particle rotations U in the full space to obtain an estimated energy of the quantum system characterized by the respective Hamiltonian (i.e., the Hamiltonian in full space) (step 404). Because of Thouless's theorem, the multiple single-particle rotations U can be efficiently implemented as a rotation of the underlying basis of the Hamiltonian (in full space), e.g., $U a_j^\dagger U^\dagger$. This rotation of the underlying basis can be formulated as a nonlinear optimization problem. The nonlinear optimization problem follows the variational principle of quantum mechanics by minimizing an objective function that is based on the expected value of the energy for a measured 2-RDM with respect to multiple constraints (unitary rotations of the orbitals) that ensure the wavefunctions remain normalized, physical, and a one-body fermionic rotation. The constraints also ensure that the equations are efficient to evaluate classically once the 2-RDM is known. The nonlinear optimization problem can be given by Equation (8) below.

$$\min_U \left( \sum_{ij} u_{i,i'} u_{j,j'}^* h_{ij} \langle a_i^\dagger a_j \rangle_{\mathcal{A}} + \sum_{ijkl} u_{i,i'} u_{j,j'} u_{k,k'}^* u_{l,l'}^* h_{ijkl} \langle a_i^\dagger a_j^\dagger a_k a_l \rangle_{\mathcal{A}} \right) \quad (8)$$

$$\text{subject to } U a_j^\dagger U^\dagger = \sum_{j'} u_{j,j'} a_{j'}^\dagger, \quad U^\dagger U = \mathbb{1}$$

In Equation (8), U represents a unitary transformation that rotates the underlying basis, i.e., the multiple single-particle rotations, $u_{i,i'}$ are representations of U in the underlying basis (e.g., $u_{i,i'}$ is the i-i'th entry of a matrix representation of U), $h_{ij}$ and $k_{ijkl}$ are as defined in Equation (1) above, and $\langle a_i^\dagger a_j^\dagger a_k a_l \rangle_{\mathcal{A}}$ and $\langle a_i^\dagger a_j \rangle_{\mathcal{A}}$ represent the 2- and 1-RDM of the ground state active space wavefunction (which can be obtained at step 402). In some implementations the system can solve the nonlinear optimization problem by implementing a second order approximation of u, e.g., $u = e^t \approx \mathbb{1} + t + \frac{1}{2} t^2$.

In some implementations the system can solve the nonlinear optimization problem given by Equation (8) by parameterizing the unitary transformation U as an exponentiated anti-Hermitian matrix. For example, the system can set $$U = e^X$$

$$\text{with } X = \Sigma_{p,q} t_{p,q} a_p^\dagger a_q$$

$$\text{where } t_{p,q} = -t_{q,p}^* \quad (9)$$

In Equation (9), X represents a generator of the unitary U and is an anti-Hermitian matrix.

In other implementations the system can parametrize the unitary U using Givens rotations. This parametrization uses a set of angles $\{\theta\}$ associated with the set of nonredundant orbital rotation generators. For 2-RDMs obtained from an exact diagonalization of the active-space Hamiltonian, the only non-redundant parameters are single-particle generators associated with pairs of orbitals involving rotations from the active space to the virtual space and active space to the core space. Therefore, the unitary U in Equation (8) can be expressed as a product of Givens matrices:

$$U = \prod_{i \in active} \prod_{b \in core, virtual} G_{i,b}(\theta_{i,b}) \quad (10)$$

The optimal rotation of a single angle with respect to the input 2-RDM, one-, and two-electron integrals and a sweep procedure to find an energy minimizing U can be computed using known techniques, e.g., using multi-configurational self-consistent-field method (MCSF) methods for ground and excited states based on full optimizations of successive Jacobi rotations.

In some implementations the system can iterate between solving the active-space Schrödinger equation (step 402) and full-space single-particle rotations (404), e.g., iteratively perform example process 400. When the system iteratively performs example process 400, at the end of each iteration a new basis determined by minimizing the expected value of the Hamiltonian with respect to unitary rotations of the orbitals (determined by solving Equation 8 above) is used as an input for solving the active-space Schrödinger equation in a subsequent iteration. The iterative process can stop when a change in energy between iterations is lower than a predetermined threshold. In other implementations the system can perform a single orbital-relaxation procedure (step 404) once as a post-processing step.

Because of the variational principle, relaxing the orbitals in a single step as post-processing is guaranteed to reduce the energy. Furthermore, if the ground state of the active space is not achieved due to an approximate wave-function ansatz, the system can include additional single-particle orbital rotations between orbital pairs inside the active space in the relaxation. Including these rotations would correspond to an additional linear depth circuit that would have been executed perfectly on the quantum computer at step 402. However, any circuit that contains single-particle rotations at the end of the circuit can be made shorter by replacing the single particle rotations at the end of the circuit with a classical post-processing step based on single particle rotations as described above (e.g., within the active space and not the full space).

In some implementations example process 400 can be combined with one or more techniques described above with reference to example process 200. For example, step 402 may be performed using the techniques described at steps 202-208 of example process 200, where the contraction of the expansion operators that act on the virtual space via classical pre-computation in example process 200 (as described in steps 206 and 208) can be replaced with orbital relaxation via classical post processing (step 404). Steps 210 and 212 of FIG. 3 can then be performed.

Implementations of the digital and/or quantum subject matter and the digital functional operations and quantum operations described in this specification can be implemented in digital electronic circuitry, suitable quantum circuitry or, more generally, quantum computational systems, in tangibly-embodied digital and/or quantum computer software or firmware, in digital and/or quantum computer hardware, including the structures disclosed in this specification and their structural equivalents, or in combinations of one or more of them. The term "quantum computational systems" may include, but is not limited to, quantum computers, quantum information processing systems, quantum cryptography systems, or quantum simulators.

Implementations of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits, or a combination of one or more of them. Alternatively or in addition, the program instructions can be encoded on an artificially-generated propagated signal that is capable of encoding digital and/or quantum information, e.g., a machine-generated electrical, optical, or electromagnetic signal, that is generated to encode digital and/or quantum information for transmission to suitable receiver apparatus for execution by a data processing apparatus.

The terms quantum information and quantum data refer to information or data that is carried by, held or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states are possible.

The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, multiple digital and quantum processors or computers, and combinations thereof. The apparatus can also be, or further include, special purpose logic circuitry, e.g., an FPGA (field programmable gate array), an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL or Quipper.

A digital and/or quantum computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers to be "configured to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum processors or both, or any other kind of central digital and/or quantum processing unit. Generally, a central digital and/or quantum processing unit will receive instructions and digital and/or quantum data from a read-only memory, a random access memory, or quantum systems suitable for transmitting quantum data, e.g. photons, or combinations thereof.

The elements of a digital and/or quantum computer include a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more non-transitory machine-readable storage media, and that are executable on one or more digital and/or quantum processing devices. The systems described in this specification, or portions of them, can each be implemented as an apparatus, method, or system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by a hybrid quantum-classical computing device for a quantum simulation of a physical system characterized by a respective Hamiltonian, the method comprising:

selecting, by one or more classical processors included in the hybrid quantum-classical computing device, a first set of basis functions for the quantum simulation, wherein the first set of basis functions comprises i) an active set of orbitals, and ii) a virtual set of orbitals;

defining, by the one or more classical processors, a set of expansion operators for the quantum simulation, wherein expansion operators in the set of expansion operators approximate fermionic excitations in an active space spanned by the active set of orbitals and a virtual space spanned by the virtual set of orbitals and act on both qubits that define the active space and additional qubits that define the virtual space;

performing multiple quantum computations to determine a matrix representation of the Hamiltonian in a second set of basis functions, wherein each basis function in the second set of basis functions comprises a respective expansion operator applied to a wavefunction prepared using the qubits that define the active space, and wherein determining the matrix representation of the Hamiltonian comprises, for each of one or more matrix elements:

determining, by the one or more classical processors, that the matrix element comprises operators that act on the virtual space, in response to determining that the matrix element comprises operators that act on the virtual space, performing, by the one or more classical processors, a classical computation to contract the matrix element to a matrix element comprising operators that act on the active space only, and preparing the qubits that define the active space in a quantum state that represents the wavefunction and measuring, by a quantum computing device included in the hybrid quantum-classical computing device and using the quantum state, the operators that act on the active space only to determine a value for the matrix element that comprises contributions from the virtual space that extend beyond the active space without requiring the additional qubits that define the virtual space;

computing, by the one or more classical processors and using the determined matrix representation of the Hamiltonian in the second set of basis functions, eigenvalues and eigenvectors of the Hamiltonian; and determining, by the one or more classical processors, properties of the physical system using the computed eigenvalues and eigenvectors.

2. The method of claim 1, further comprising performing multiple computations to determine an overlap matrix in the second set of basis functions, wherein each element of the overlap matrix represents a respective overlap of two basis functions in the second set of basis functions, wherein determining the overlap matrix comprises, for each matrix element:

determining whether the matrix element comprises operators that act on the virtual space or operators that act on the active space only;

in response to determining that the matrix element comprises operators that act on the virtual space, performing a classical computation to contract the matrix element to a matrix element comprising operators that act on the active space only; and measuring the operators that act on the active space only to determine a value for the matrix element.

3. The method of claim 2, wherein computing, using the determined matrix representation of the Hamiltonian in the second set of basis functions, eigenvalues and eigenvectors of the Hamiltonian comprises:

computing, using the determined matrix representation of the Hamiltonian in the second set of basis functions and the determined overlap matrix, eigenvalues and eigenvectors of the Hamiltonian.

4. The method of claim 1, wherein measuring operators that act on the active space only to determine a value for the matrix element comprises:

preparing the wavefunction in the active space; and measuring a Pauli operator corresponding to a qubit transformation of the matrix element.

5. The method of claim 2, further comprising, before computing eigenvalues and eigenvectors of the Hamiltonian:

computing eigenvalues and eigenvectors of the determined overlap matrix;

removing eigenvalues of the determined overlap matrix that are equal to zero or smaller than a predetermined threshold to define an updated overlap matrix; and using the updated overlap matrix to compute the eigenvalues and eigenvectors of the Hamiltonian.

6. The method of claim 1, wherein the first set of basis functions further comprises a core set of orbitals.

7. The method of claim 1, wherein defining a set of expansion operators for the quantum simulation further comprises selecting a maximum excitation level for the set of expansion operators.

8. The method of claim 1, wherein the active space comprises a subspace of total active space that is excited into the virtual space.

9. The method of claim 1, wherein measuring the operators that act on the active space only to determine a value for the matrix element comprises:

approximating the operators that act on the active space only using cumulant approximations or ensemble variational methods; and measuring the approximated operators that act on the active space only.

10. The method of claim 1, wherein the Hamiltonian characterizes an electronic structure of a semiconductor, and wherein simulating the physical system comprises simulating properties of the semiconductor.

11. The method of claim 10, wherein properties of the semiconductor comprise conductivity or resistance.

12. A method performed by a hybrid quantum-classical computing device for simulating a quantum system, the method comprising:

performing, by a quantum computing device included in the hybrid quantum-classical computing device, a quantum simulation of a quantum system using qubits that define an active space to obtaining a simulation output from the quantum simulation of the quantum system, wherein the quantum simulation comprises a quantum simulation in active space and the simulation output comprises an expected value of the energy of the quantum system in active space; and classically post-processing the simulation output, comprising adjusting, by classical computation performed by one or more classical processors included in the hybrid quantum-classical computing device, the simulation output using multiple single particle rotations in full space to obtain an estimated energy of the quantum system in full space, the adjusting comprising:

solving a nonlinear optimization problem, wherein the nonlinear optimization problem comprises:

an objective function comprising the expected value of the energy of the quantum system in active space, and one or more constraints that specify unitary rotations of quantum system orbitals, wherein solving the nonlinear optimization problem comprises identifying multiple single particle rotations in full space that rotate an underlying basis of the simulation output and minimizes the objective function subject to the one or more constraints; and applying the identified multiple single particle rotations in full space to rotate the underlying basis of the simulation output in full space and obtain the estimated energy of the quantum system in full space;

wherein classically post-processing the simulation output reintroduces virtual space contributions that extend beyond the active space to the simulation output without requiring additional qubits or gate complexity.

13. The method of claim 12, wherein the simulation output comprises an estimated energy of the quantum system.

14. The method of claim 12, wherein the quantum system is characterized by an electronic structure Hamiltonian, and wherein the simulation output comprises a two electron reduced density matrix (2-RDM) for the ground state of the quantum system.

15. The method of claim 12, wherein solving the nonlinear optimization problem further comprises parameterizing a unitary operator representing the multiple single particle rotations as an exponentiated anti-Hermitian matrix.

16. The method of claim 12, wherein solving the nonlinear optimization problem comprises parameterizing a unitary operator representing the multiple single particle rotations as a product of Givens rotations.

17. The method of claim 16, wherein solving the nonlinear optimization problem comprises implementing a multi-configurational self-consistent-field method.

18. The method of claim 12, wherein the one or more constraints produce normalized and physical wavefunctions.

19. The method of claim 12, further comprising iteratively, until a change in energy between iterations is lower than a predetermined threshold:
- providing the adjusted simulation output as an input for a subsequent quantum simulation in active space of the quantum system; and
- obtaining a subsequent simulation output from the subsequent quantum simulation of the quantum system.

20. An apparatus comprising:
quantum hardware; and
one or more classical processors;
wherein the apparatus is configured to perform operations comprising:
- selecting, by one or more classical processors included in a hybrid quantum-classical computing device, a first set of basis functions for a quantum simulation, wherein the first set of basis functions comprises i) an active set of orbitals, and ii) a virtual set of orbitals;
- defining, by the one or more classical processors, a set of expansion operators for the quantum simulation, wherein expansion operators in the set of expansion operators approximate fermionic excitations in an active space spanned by the active set of orbitals and a virtual space spanned by the virtual set of orbitals and act on both qubits that define the active space and additional qubits that define the virtual space;
- performing multiple quantum computations to determine a matrix representation of the Hamiltonian in a second set of basis functions, wherein each basis function in the second set of basis functions comprises a respective expansion operator applied to a wavefunction prepared using the qubits that define the active space, and wherein determining the matrix representation of the Hamiltonian comprises, for each of one or more matrix elements:
  - determining, by the one or more classical processors, that the matrix element comprises operators that act on the virtual space,
  - in response to determining that the matrix element comprises operators that act on the virtual space, performing, by the one or more classical processors, a classical computation to contract the matrix element to a matrix element comprising operators that act on the active space only, and
  - preparing the qubits that define the active space in a quantum state that represents the wavefunction and measuring, by a quantum computing device included in the hybrid quantum-classical computing device and using the quantum state, the operators that act on the active space only to determine a value for the matrix element that comprises contributions from the virtual space that extend beyond the active space without requiring the additional qubits that define the virtual space;
- computing, by the one or more classical processors and using the determined matrix representation of the Hamiltonian in the second set of basis functions, eigenvalues and eigenvectors of the Hamiltonian; and
- determining, by the one or more classical processors, properties of the physical system using the computed eigenvalues and eigenvectors.

\* \* \* \* \*